(12) United States Patent
Lee

(10) Patent No.: US 8,734,707 B2
(45) Date of Patent: May 27, 2014

(54) CURVE-SHAPED DISPLAY MODULE, MANUFACTURE METHOD THEREOF, AND MANUFACTURE APPARATUS FOR MANUFACTURING THE SAME

(75) Inventor: Tak-Hon Lee, Hsin-Chu (TW)

(73) Assignee: Au Optronics Corporation, Hsin-Chu (TW)

( * ) Notice: Subject to any disclaimer, the term of this patent is extended or adjusted under 35 U.S.C. 154(b) by 349 days.

(21) Appl. No.: 13/085,682

(22) Filed: Apr. 13, 2011

(65) Prior Publication Data

US 2012/0044618 A1 Feb. 23, 2012

(30) Foreign Application Priority Data

Aug. 18, 2010 (TW) .............................. 99127565 A

(51) Int. Cl.
*B29C 51/10* (2006.01)

(52) U.S. Cl.
USPC ............................ 264/494; 264/511; 264/571

(58) Field of Classification Search
None
See application file for complete search history.

(56) References Cited

U.S. PATENT DOCUMENTS 5,477,024 A * 12/1995 Share et al. .............. 219/121.69
5,746,967 A * 5/1998 Hoy et al. ..................... 264/406
2006/0288737 A1 12/2006 Sayahi
2007/0176309 A1 8/2007 Kanbayashi
2010/0208190 A1 8/2010 Yoshida

FOREIGN PATENT DOCUMENTS

| CN | 101013243 A | 8/2007 |
| CN | 101563643 A | 10/2009 |
| TW | 200706503 | 2/2007 |
| TW | 200736711 | 11/2009 |
| TW | 201106049 | 2/2011 |

OTHER PUBLICATIONS

English translation of abstract of TW 201106049.
English translation of abstract of TW 200736711.
China Office Action dated Dec. 12, 2011.

* cited by examiner

*Primary Examiner* — Monica Huson
(74) *Attorney, Agent, or Firm* — McClure, Qualey & Rodack, LLP

(57) ABSTRACT

A curve-shaped display module, a manufacture method thereof, and a manufacture apparatus for manufacturing the same are provided. The manufacture apparatus includes a curve-forming mold, a curable material-dispensing device, and a curing device. The manufacture method includes the following steps: pressing the display panel to make the display panel have a curved shape and a first curved surface by using the curve-forming mold; distributing a curable material on the first curved surface by using the dispensing device; and curing the curable material to form a cured casing by using the curing device. The display module has the display panel having the first curved surface and the cured casing formed from the curing of the curable material. The cured casing covers and is closely attached to the first curved surface with an adhesion force therebetween to sustain the curved shape of the display panel.

13 Claims, 12 Drawing Sheets

CURVE-SHAPED DISPLAY MODULE, MANUFACTURE METHOD THEREOF, AND MANUFACTURE APPARATUS FOR MANUFACTURING THE SAME

BACKGROUND

1. Technical Field

The disclosure generally relates to a display module, a manufacture method thereof, and a manufacture apparatus for manufacturing the same; particularly, the present disclosure relates to a curve-shaped display module, a manufacture method thereof, and a manufacture apparatus for manufacturing the same.

2. Related Art

With advances in technology, design of electronic devices becomes more and more diverse. Electronic devices such as mobile communication devices, notebook computers, automobile electronic devices, and home televisions are continuously promoted in functionality or exterior design. Display apparatuses are widely used in the electronic devices mentioned above and play a very important role in functionality and appearance design. Besides traditional flat-shaped display apparatus, the curve-shaped display apparatus is also developed to meet different design requirements.

FIG. 1 shows a traditional curve-shaped display apparatus. The display apparatus includes a planar display panel 10 and two curve-forming plates 20, 30 disposed on two sides of the display panel 10 to transform the planar display panel 10 into a curve-shaped display panel. The ends of the curve-forming plates 20, 30 are bonded via sealants 40 to maintain a constant gap between the two curve-forming plates 20, 30. With such a design, the display panel 10 is confined between the two curve-forming plates 20, 30 to maintain in curved shape.

However, in the above design, interspaces exist between the display panel 10 and the two curve-forming plates 20, 30, causing change in curvature to the display panel 10 confined between the curve-forming plates 20, 30. Besides, the relative displacement resulted from the structural instability between the display panel 10 and the curve-forming plates 20, 30 may occur, leading to damage or weariness of related components. Furthermore, during the assembly process, it is difficult to control the assembly yield of the display panel 10 and the curve-forming plates 20, 30.

SUMMARY

It is an object of the present embodiment to provide a curve-shaped display module that has better structural stability.

It is another object of the present embodiment to provide a manufacturing method of a curve-shaped display module and a manufacture apparatus for manufacturing the same.

The manufacture apparatus of display module mainly includes a curve-forming mold, a curable material-dispensing device, and a curing device. The curved-forming mold includes a curved sucking device and a base, wherein the curved sucking device has a first curved surface, and the base has a second curved surface having a shape corresponding to the first curved surface. The dispensing device includes a carrier and a dispensing head, wherein the dispensing device provides curable material onto the carrier. The curing device is disposed corresponding to the carrier and transforms the distributed curable material into a cured casing.

The manufacturing method of display module includes the step of pressing a display panel to make the display panel have a curved shape and a first curved surface by using a curve-forming mold. After the display panel is transferred and disposed between a curved sucking device and a base, the curved sucking device and the base move relatively and press the display panel into the curved shape. The curved sucking device holds the curved display panel to maintain the curved shape of the display panel. After that, the curable material is injected onto the carrier by the dispensing device so that the curable material is distributed on the first curved surface. The curable material is then cured to form a first cured casing by using the curing device.

The display panel has a second curved surface opposite to the first curved surface. Both two curved surfaces can be a display surface of the display panel. The first cured casing covers the first curved surface and closely attached to the first curved surface with an adhesion force therebetween to sustain the curved shape of the display panel.

DETAILED DESCRIPTION OF THE PREFERRED EMBODIMENT

The present invention generally relates to a curve-shaped display module, a manufacture method thereof, and a manufacture apparatus for manufacturing the same. The display module is formed by processing a display panel. In a preferred embodiment, the display panel includes liquid crystal display, organic light emitting diode display, electrophoretic display, and other flexible flat panel display. The present invention utilizes curable material to sustain the curved shape of display panel. The curable material preferably includes light curable resin, thermosetting resin, self-curing resin, and other transparent or opaque curable material.

Figure 1:
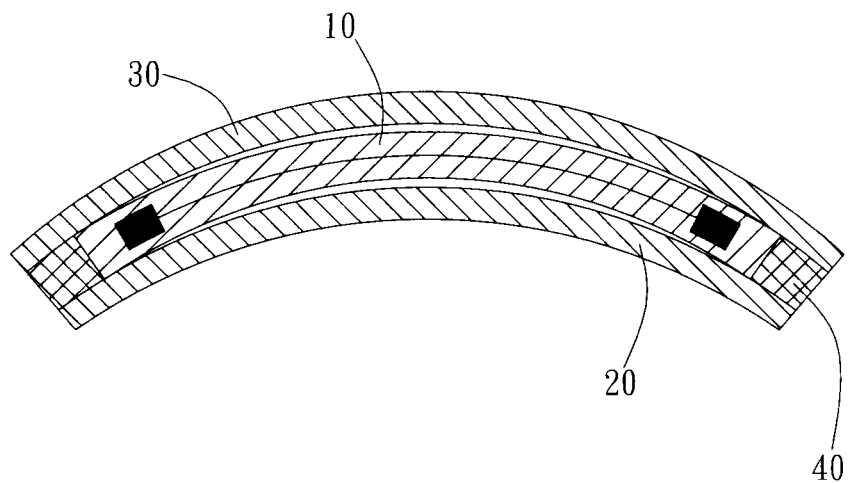
FIG. 1 is a schematic diagram of the traditional curve-shaped display apparatus.
Figure 2:
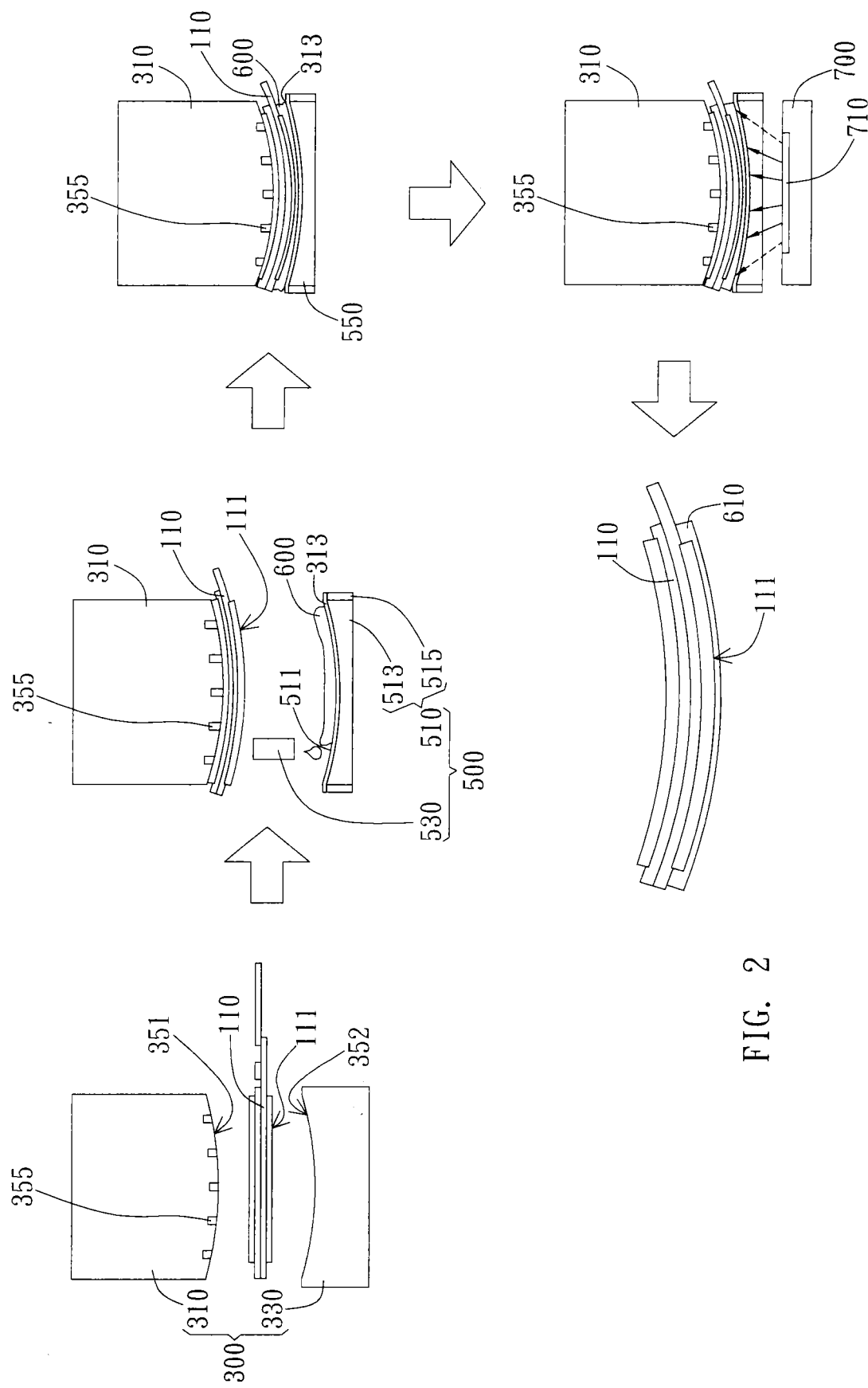
FIG. 2 is a process flow of the manufacture method of the display module in one embodiment of the present invention.

As shown in the embodiment of FIG. 2, the manufacture apparatus of display module mainly includes a curve-forming mold 300, a curable material dispensing device 500, and a curing device 700. The curve-forming mold 300 preferably includes a curved sucking device 310 and a base 330, wherein the curved sucking device 310 has a first curved surface 351, while the base 330 has a second curved surface 352 corresponding to the first curved surface 351. That is, the base 330 preferably has a complementary shape matching the first curved surface 351. For example, as shown in FIG. 2, when the first curved surface 351 is a convex surface, the second curved surface 352 is a concave surface. Alternatively, when the first curved surface 351 is a concave surface, the second curved surface 352 is a convex surface . The first curved surface 351 and the second curved surface 352 preferably both have an axis of curvature and arcs formed around the axis of curvature. In other words, the first curved surface 351 and the second curved surface 352 linearly extend in the extending direction of the axis of curvature. Moreover, the first curved surface and the second curved surface preferably have different curvatures. When the first curved surface is a convex surface with a radius of curvature of r, the radius of curvature R of the second curved surface is r+d (i.e. R=r+d) as the second curved surface is a concave surface. When the first curved surface is a concave surface with a radius of curvature of r, the radius of curvature R of the second curved surface is r−d (i.e. R=r−d) as the second curved surface is a convex surface. That is, the two curved surfaces maintain a specific distance d, wherein d is the thickness of display panel. When the curved surface has a radius of curvature of ellipse or any other shape, the radius of curvatures of two curved surfaces also preferably maintain the specific distance d. In a preferred embodiment, when the display module is in the shape-forming position, the center of curvature of the first curved surface 351 and the center of curvature of the second curved surface 352 coincide with or come close to each other to keep approximate distance between the two curved surfaces at any position. The first curved surface 351 and the second curved surface 352 preferably have the same circle center but different radius of curvature. However, in the other embodiments, the first curved surface 351 and the second curved surface 352 may have the same radius of curvature on their cross sections of maximum curvature.

As shown in FIG. 2, the display panel 110 is pressed into a curved shape between the curved sucking device 310 and the base 330 and sucked onto the curved sucking device 310 due to the suction force generated by the curved sucking device 310 to maintain the curved shape. The curved sucking device 310 can generate the suction force by vacuum suction, electrostatic attraction, and other similar methods. One or more sucking heads 355 are disposed on the first curved surface 351 to distribute the suction force on the first curved surface 351.

In the embodiment shown in FIG. 2, a curable material dispensing device 500 includes a carrier 510 and a dispensing unit 530. The carrier 510 has a supporting surface 511 preferably in a curved shape the same as or similar to the second curved surface 352. In another embodiment, the supporting surface 511 may be a planar surface. As shown in FIG. 2, the dispensing unit 530 is disposed corresponding to the carrier 510 and configured to inject the curable material 600 to the carrier 510, preferably onto the supporting surface 511. When the display panel 110 is disposed on the carrier 510, the curable material 600 is distributed on the display panel 110. As shown in FIG. 2, a curing device 700 is also disposed corresponding to the carrier 510 and transforms the curable material 600 into a cured casing. The curing device 700 can be correspondingly modified to adapt different curable material 600. As shown in FIG. 2, when the curable material 600 is a light curable resin, the curing device 700 correspondingly has an illumination unit 710. When the curable material 600 is a thermosetting resin, the curing device 700 accordingly has a heating unit.

Figure 3:
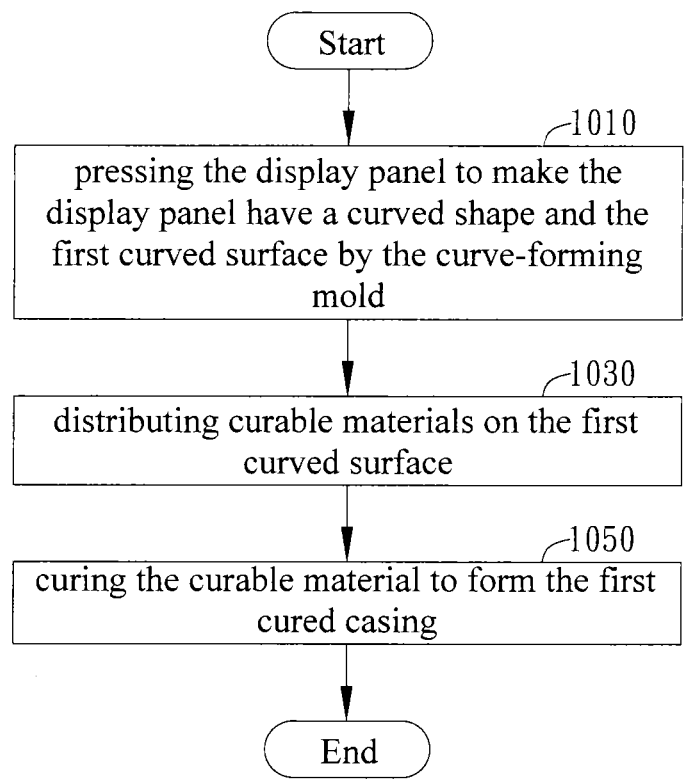
FIG. 3 is a flowchart of an embodiment of the method of manufacturing the display module.

FIG. 3 illustrates a flowchart of the manufacturing method of the display module. Step 1010 includes pressing the display panel 110 to make the display panel 110 have a curved shape and the first curved surface 111 by the curve-forming mold 300. Also referring to FIG. 2, when the display panel 110 is disposed between the curved sucking device 310 and the base 330, the curved sucking device 310 and the base 330 move relative to each other and press the display panel 110 into the curved shape. In this embodiment, the second curved surface 352 of the base 330 presses against one surface of the display panel 110 forming the first curved surface 111. The first curved surface 111 can be the display surface of the display panel 110 or a surface opposite to the display surface, depending on the process requirements. If the second curved surface 352 is a concave surface, as shown in FIG. 2, the first curved surface 111 is a convex surface, and vice versa.

As described above, the curved sucking device 310 can generate the suction force by vacuum suction and other similar methods. After the display panel 110 pressed between the curved sucking device 310 and the base 330, the curved sucking device 310 holds the display panel 110 by the generated suction force to maintain the curved shape. Moreover, the curved sucking device 310 holds the display panel 110 in a curved-shape state and transports the display panel 110 to the next manufacturing process.

Step 1030 includes distributing curable materials 600 on the first curved surface 111. As shown in the FIG. 2, the curable material is distributed onto the supporting surface 511 of the carrier 510 by the dispensing unit 530. Then, the curved sucking device 310 transports the display panel 110 to the carrier 510 and presses the display panel 110 toward the carrier 510 and embeds the first curved surface 111 into the curable material 600. In this way, the curable material 600 is transferred onto the first curved surface 111, wherein one side of the curable material 600 is coated on the first curved surface 111 and the other side has the same curvature as the supporting surface 511.

Figure 4A:
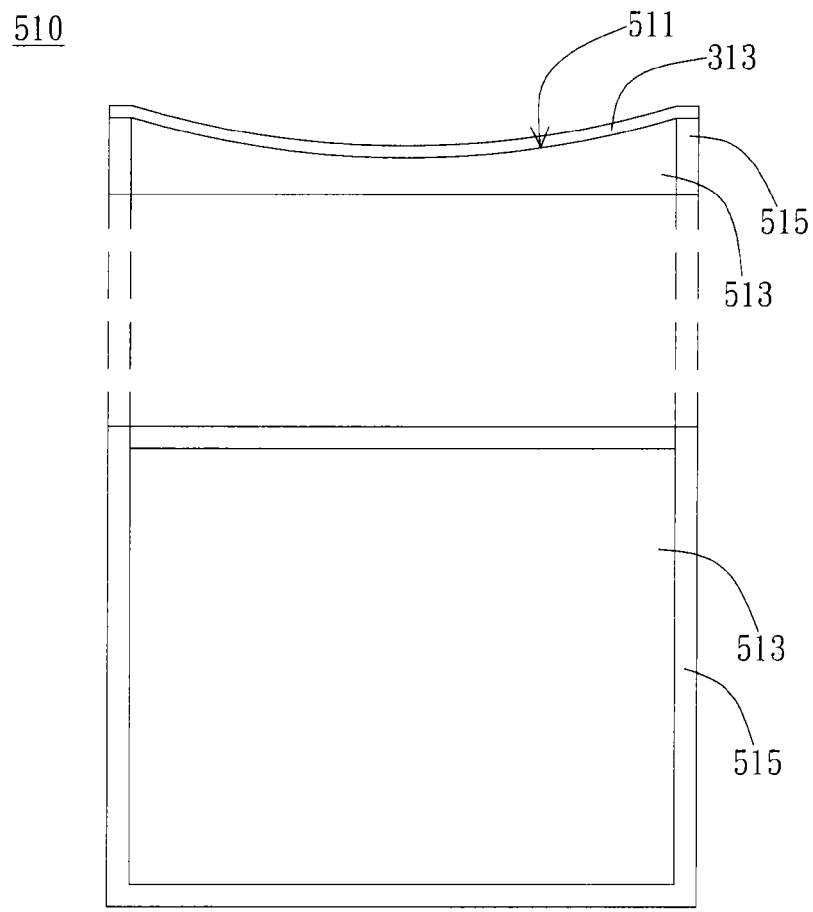
FIG. 4A is a schematic diagram of one embodiment of the carrier.
Figure 4B:
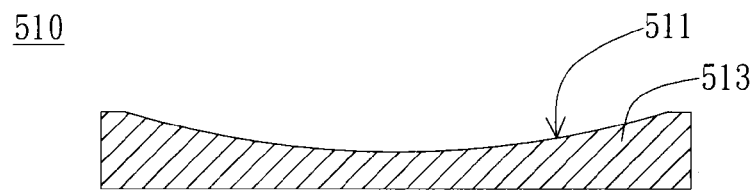
FIG. 4B is a schematic diagram of another embodiment of carrier.
Figure 5:
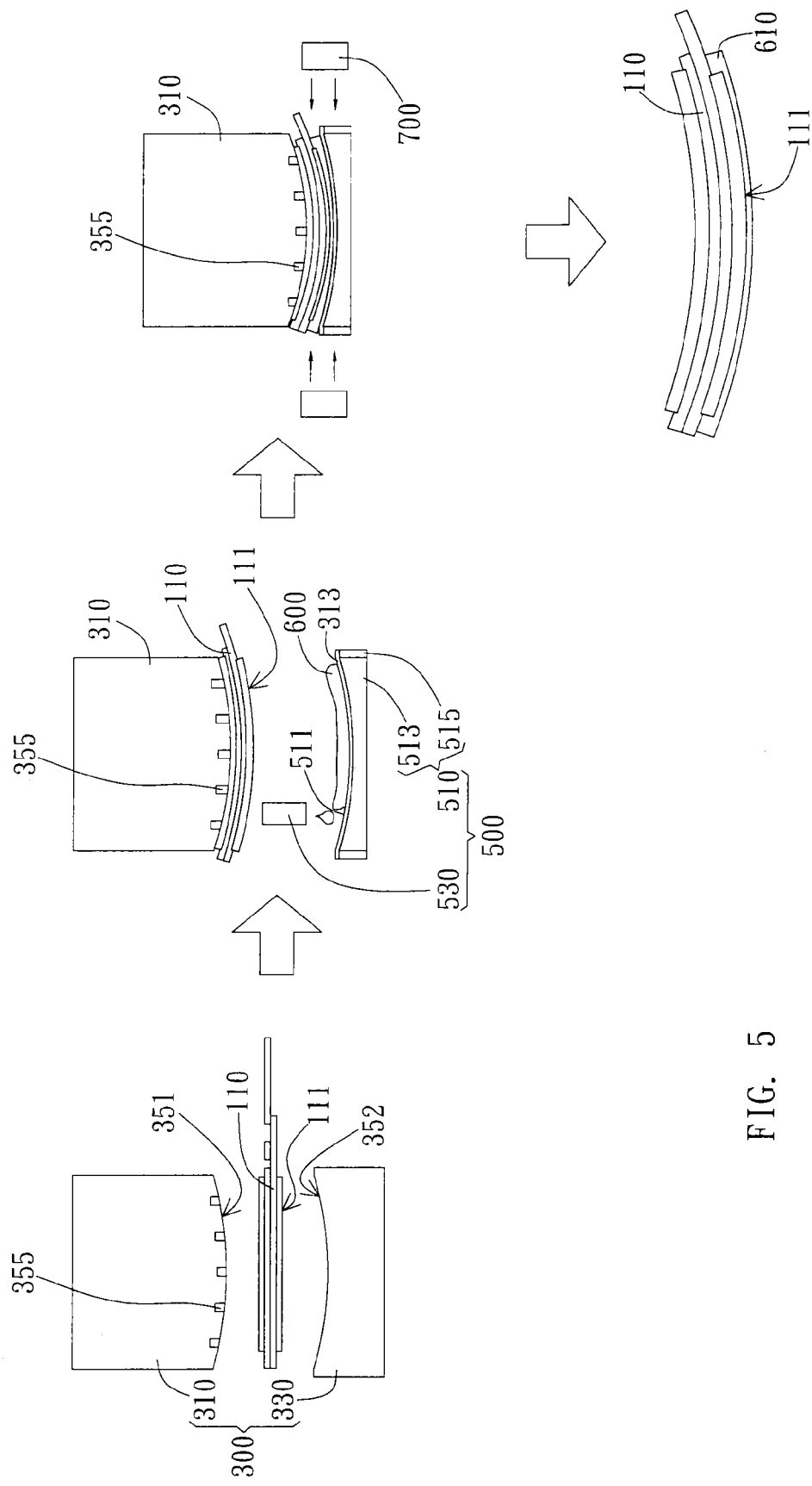
FIG. 5 is a process flow of another embodiment of manufacturing the display module.

Step 1050 includes curing the curable material 600 to form the first cured casing 610. When the curable material 600 is cured, the curved sucking device 310 preferably still holds the display panel 110 and maintains the curved shape of the display panel 110. The first cured casing 610 is attached to the first curved surface 111 with adhesion force to sustain the curved shape of the display panel 110. Different curing device 700 can be designed to adapt to different curable materials 600. If the curable material 600 is a light curable resin, the illumination unit 710 of the curing device is employed to irradiate and cure the curable material 600. In the embodiment illustrated in FIG. 2, the curing device 700 irradiates the curable material 600 from the bottom of the carrier 510. In order to irradiate from the bottom of the carrier 510, the bottom of the carrier 510 preferably has a transparent region 513, as shown in FIG. 4A. In this embodiment, the carrier 510 consists of frame 515. Middle section of the frame 515 is made of glass, reinforced plastic, or other light-transmissible material and forms the transparent region 513. In another embodiment illustrated in FIG. 4B, the carrier 510 itself can be directly made of glass, reinforced plastic or light-transmissible material. In the embodiment shown in FIG. 4B, the entire carrier 510 is made of light-transmissible material, so that the carrier itself serves as the transparent region 513, wherein the top surface of the transparent region 513 forms the supporting surface 511. As shown in FIG. 4A, the supporting surface 511 of the carrier 510 preferably has a mold releasing layer 313 formed thereon. The mold releasing layer 313 is preferably made of transparent polytetrafluoroethylene or high self-lubrication polymeric material. By means of the mold releasing layer 313, the curable material 600 is easy to separate from the carrier 510 after curing. Since the mold releasing layer 313 is transparent to light, the mold releasing layer 313 will not block the propagation of light through the transparent region 513. However, in a different embodiment shown in FIG. 5, if the carrier 510 or the mold releasing layer 313 is made of light-impermissible material, the curing device 700 can irradiate and cure the curable material 600 from the side of the carrier 510.

Figure 6:
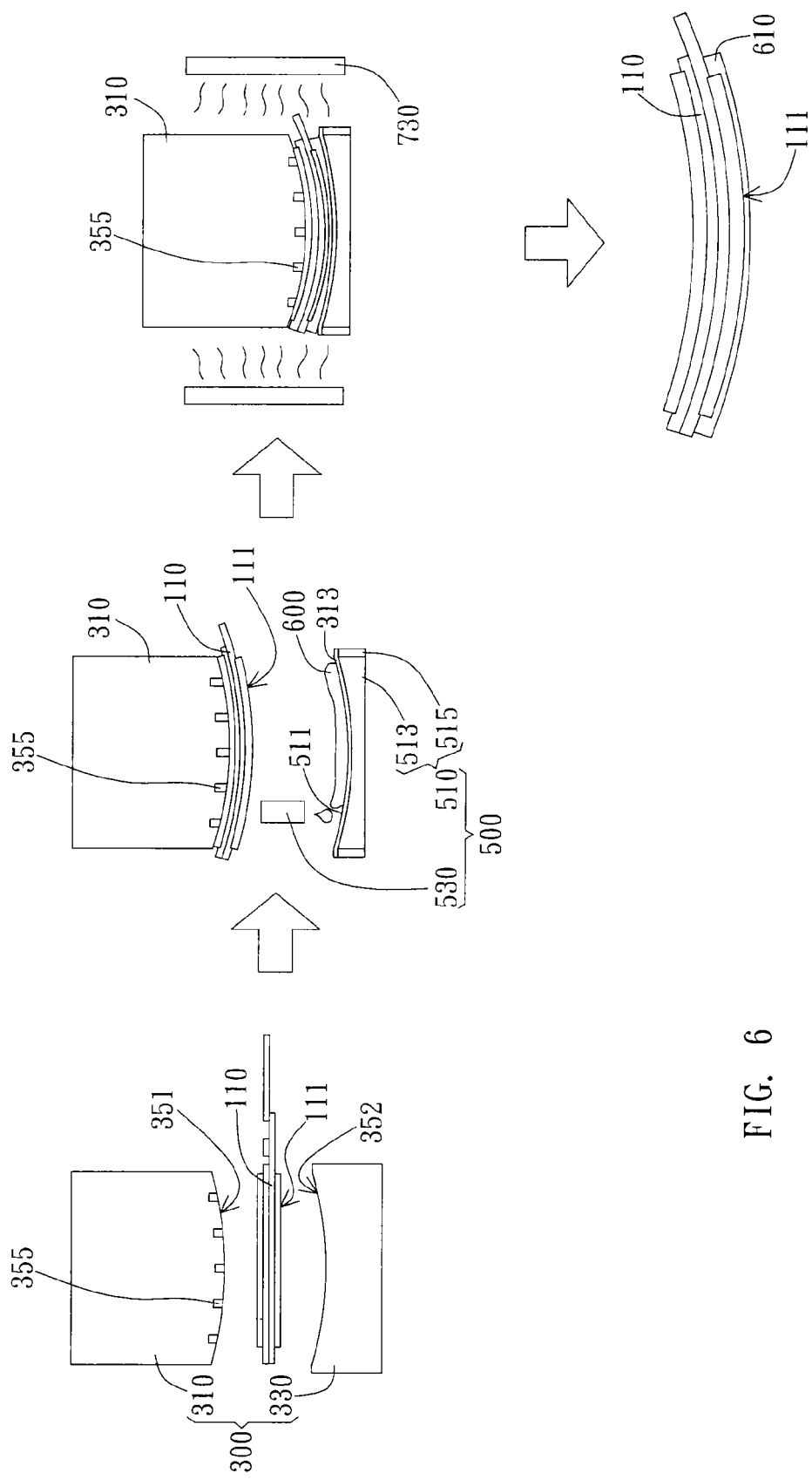
FIG. 6 is a process flow of another embodiment of manufacturing the display module.

As shown in FIG. 6, the curable material 600 is a thermosetting resin, and the curing device 700 correspondingly has a heating unit 730. The heating unit 730 preferably uses the infrared ray or other methods heating the curable material 600. When the heating unit 730 heats the curable material 600, the curved sucking device 310 preferably still holds the display panel 110 and maintains the curved shape of the display panel 110.

Figure 7:
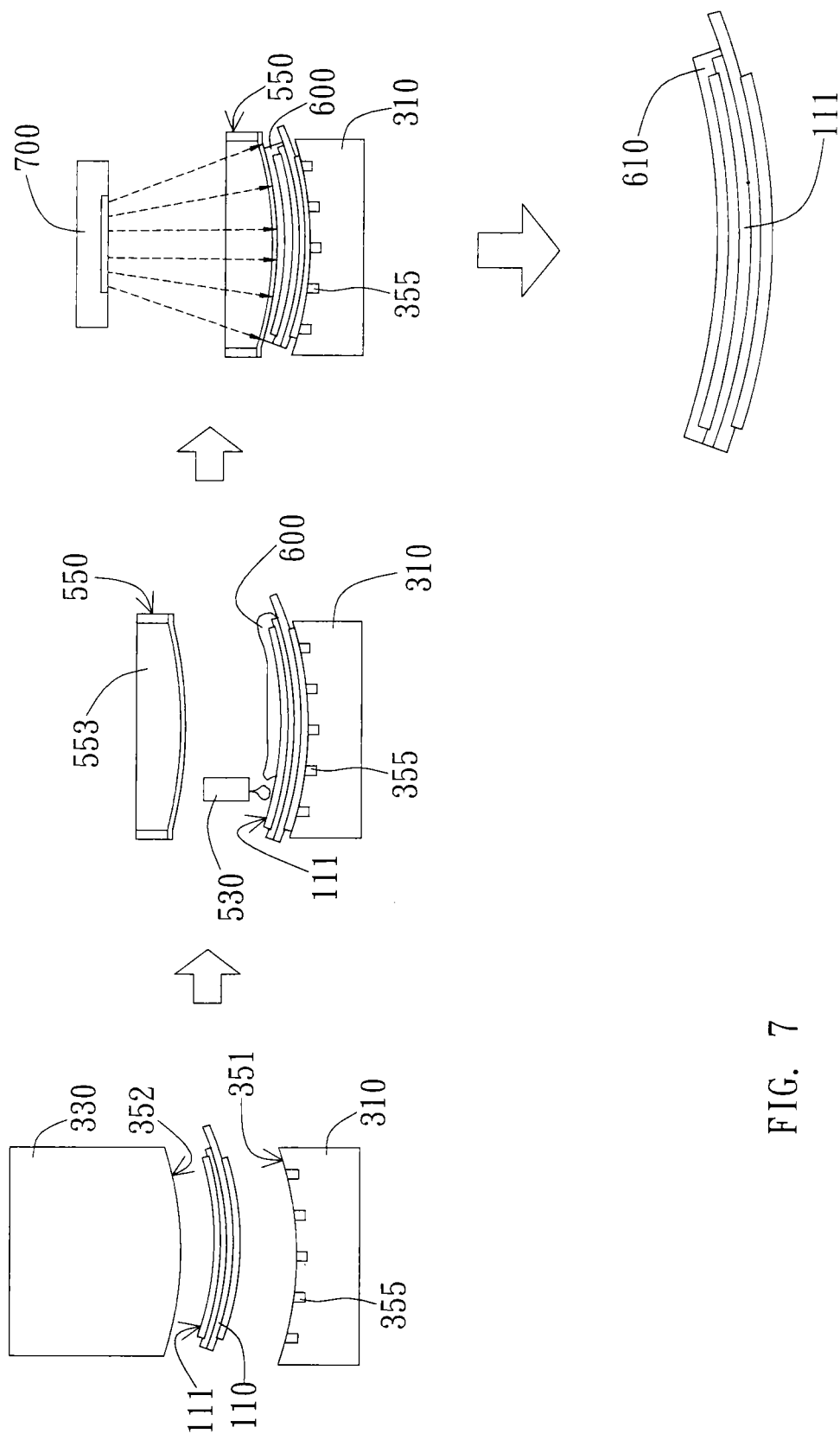
FIG. 7 is a schematic view showing an embodiment of distributing curable material directly on the first curved surface.
Figure 8:
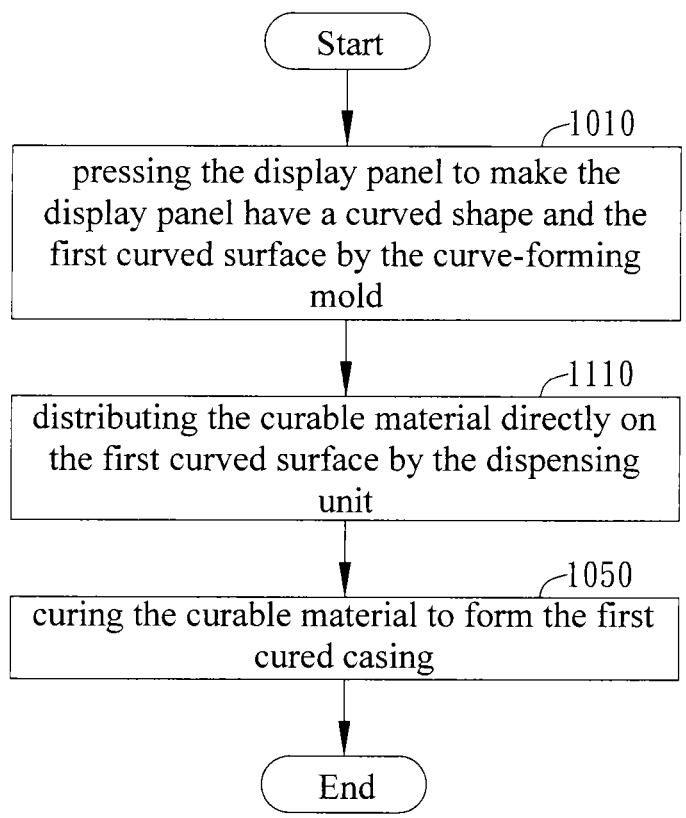
FIG. 8 is a flowchart of another embodiment of the method of manufacturing the display module.

As illustrated in FIG. 7, in another embodiment, the curved sucking device 310 is disposed under the base 330, and the first curved surface 351 of the curved sucking device 310 is a concave surface. The base 330 presses downwardly, and the display panel 110 is bent along the second curved surface 352 of the base 330 to form the first curved surface 111 of the display panel 110. The curve-shaped display panel 110 is then sucked by the curved sucking device 310 to maintain its curved shape. For such a design, the method illustrated in the FIG. 8 includes a step 1110 of distributing the curable material 600 directly on the first curved surface 111 by the dispensing unit 530. The dispensing unit 530 can distribute the curable material 600 on the first curved surface 111 by coating, overflow, spraying, dispensing, or other similar way. After distributing the curable material 600, the mold 550 presses against the uncured curable material 600 to define the shape of the curable material 600, as shown in FIG. 7. In subsequent curing step, the curable material is cured by light-curing, thermosetting, or other equivalent way to form the first cured casing 610. The mold 550 is similar to the carrier 510, having a transparent region to allow light to pass therethrough.

Figure 9A:
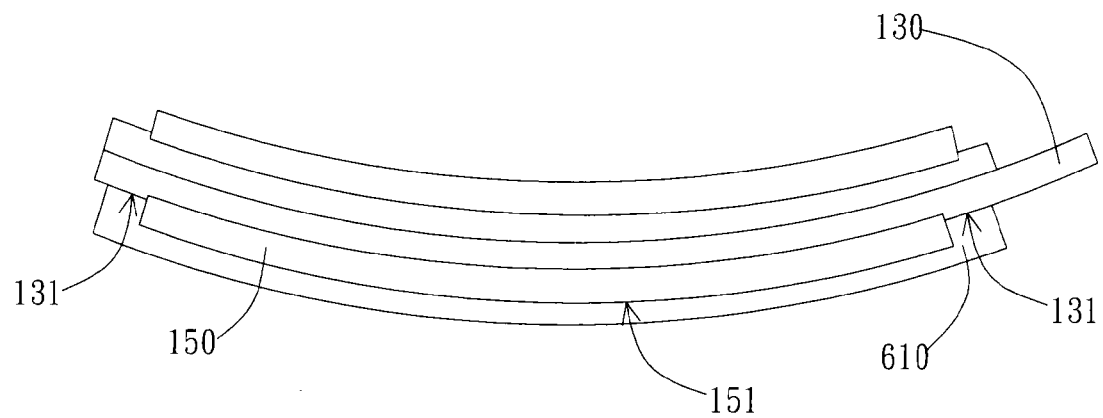
FIG. 9A is a cross-sectional view of an embodiment of the display module.

As shown in FIG. 9A, the bottom of the display panel 110 includes an optical layer 150 attached to a substrate 130. The optical layer 150 preferably includes a diffusion film, a polarizing film, or other optical films. When the display panel 110 is bent to form the first curved surface 111, the first curved surface 111 includes two regions including the substrate region 131 and the optical region 151. The substrate region 131 is a region of the substrate not covered by the optical layer 150, and the optical region 151 is a surface region of the optical layer 150. In this embodiment, when the curable material 600 is distributed on the display panel 110, a portion of the curable material 600 covers at least a portion of the substrate region 131 or the entire substrate region 131. Since the force applied onto the substrate region 131 will be directly transferred to the substrate 130, the adhesion force between the first curved surface 111 and the cured curable material 600 can be increased by increasing the contact area between the substrate region 131 and the curable material 600.

Figure 9B:
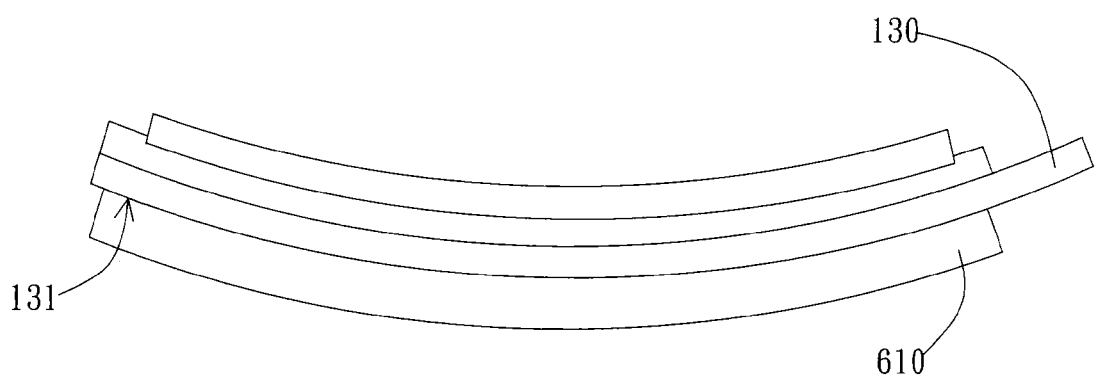
FIG. 9B is a cross-sectional view of another embodiment of the display module.

FIG. 9B shows a cross-sectional view of another embodiment of the display panel. In this embodiment, no optical layer 150 exists on the bottom of the display panel 110. In addition to the liquid crystal panel, the display panel 110 can be organic light emitting diode (OLED) display, electrophoretic display, or other kinds of display panel. For OLED display and electrophoretic display, a backlight module for providing light source is not required, so disposing the optical layer 150 for light processing is not necessary. In this embodiment, after the curable material 600 is cured, the curable material 600 is closely attached to the first curved surface 111 and maintains the shape of the first curved surface 111.

Figure 10:
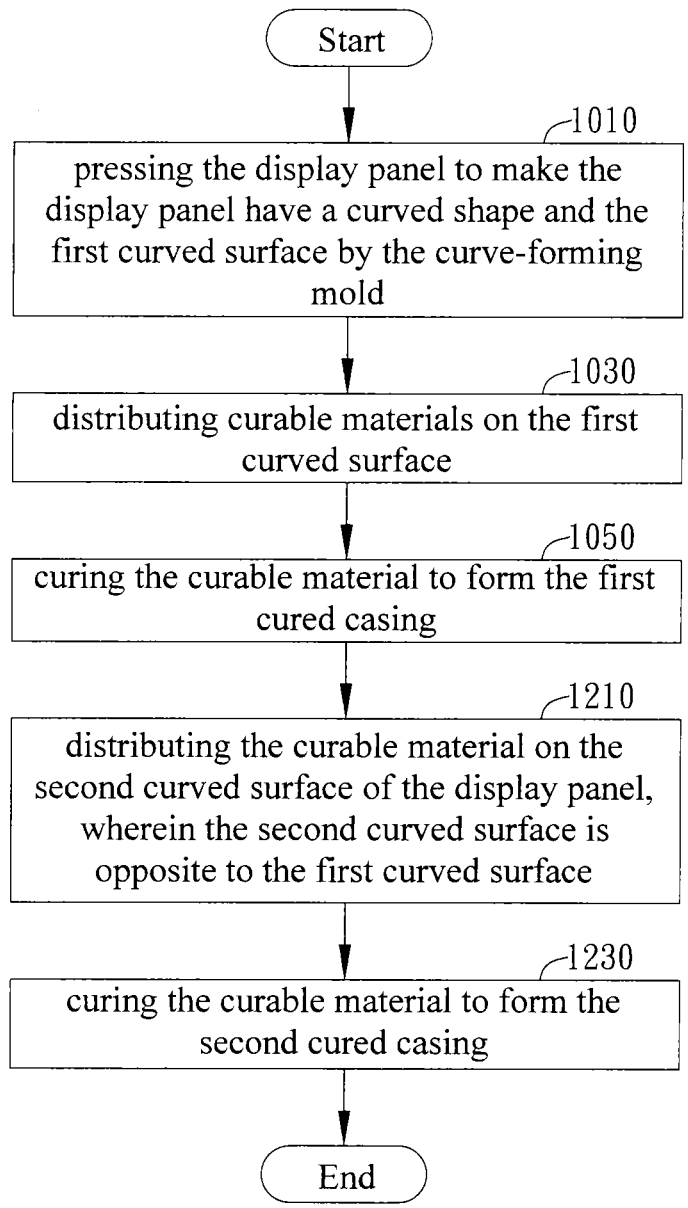
FIG. 10 is a flowchart of the method of forming cured casings on two sides of the display panel.
Figure 11:
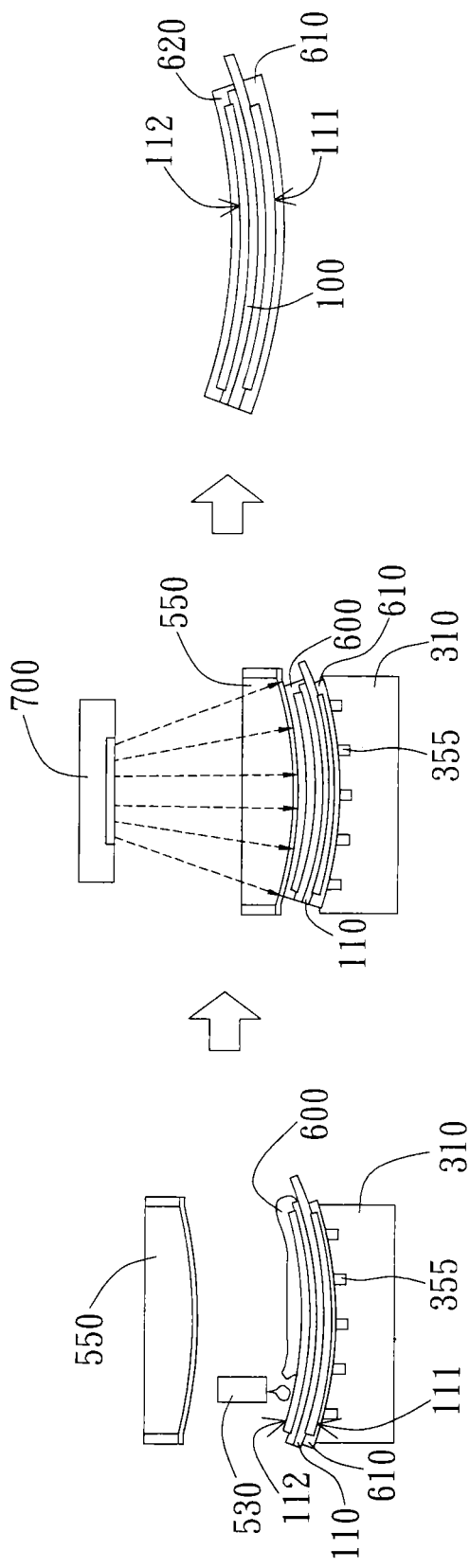
FIG. 11 is a process flow of an embodiment of forming cured casings on two sides of the display panel.

The method of FIG. 10 further includes the step 1210: distributing the curable material 600 on the second curved surface 112 of the display panel 110, wherein the second curved surface 112 is opposite to the first curved surface 111. As described above, the second curved surface 112 is the surface sucked onto the curved sucking device 310 and formed by the pressing of the first curved surface 351. As shown in FIG. 11, after the curable material 600 on the first curved surface 111 is cured and forms the first cured casing 610, the second cured casing 620 is then formed on the second curved surface 112 to enhance the structural strength. However, in another embodiment, disposing the second cured casing 620 on the second curved surface 112 is optional.

As shown in FIG. 11, when the second curved surface 112 is a concave surface, the curved sucking device 310 is preferably disposed under the first curved surface 111, and the curable material 600 is distributed directly on the second curved surface 112. Then, the mold 550 presses against the curable material 600 to define the shape of the curable material 600. The step 1230 further includes curing the curable material 600 to form the second cured casing 620. The method of curing the curable material 600 can be referred to the above embodiments and not elaborated hereinafter. Alternatively, when the second curved surface 112 is a convex surface, the carrier 510 with pre-distributed curable material 600 described above can be used, so that the curable material 600 is fixed onto the second curved surface 112.

Figure 12:
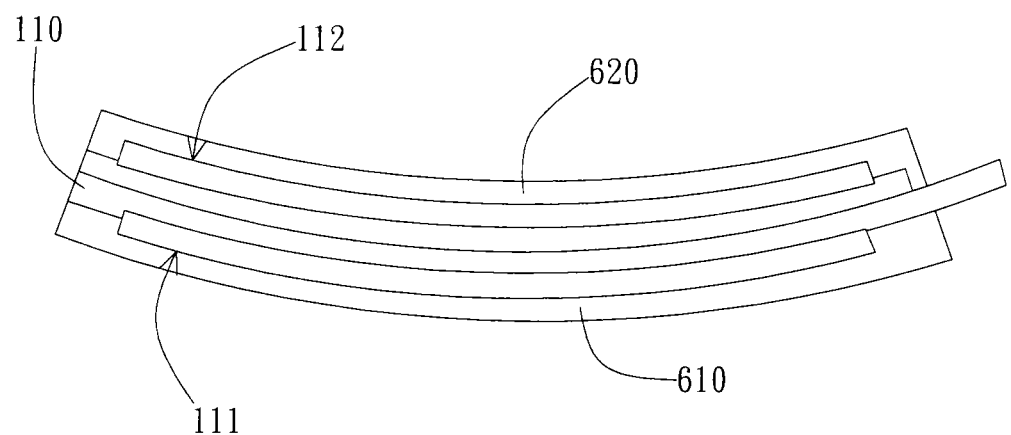
FIG. 12 is a cross-sectional view of an embodiment of the display panel having cured casings on two sides.

FIG. 12 shows another embodiment of the display module. The display panel 110 includes a first curved surface 111 and a second curved surface 112 opposite to each other. The first curved surface 111 and the second curved surface 112 both can be the display surface of the display panel 110. Since the first cured casing 610 formed from the first curable material 610 covers the first curved surface 111 and closely attached to the first curved surface 111 with adhesion force. By such adhesion force, the first cured casing 610 can sustain the curved shape of the display panel 110.

As illustrated in the FIG. 12, the display module further includes the second cured casing 620 covering the second curved surface 112 and closely attached to the second curved surface 112 with adhesion force. By such adhesion force, the first cured casing 610 and the second cured casing 620 together sustain the curved shape of the display panel 110. Moreover, in a preferred embodiment, the edges of the first cured casing 610 and the second cured casing 620 are connected to each other to enhance the structural stability and sustain the curved shape of the display panel 110. As shown in FIG. 12, the first and second cured casings 610 and 620 cover the edges of the display panel 110 and connect to each other. However, in different embodiments, since the first cured casing 610 and the first curved surface 111, and the second cured casing 620 and the second curved surface 112 have sufficient adhesion force to sustain the curved shape of the display panel 110, so the two cured casings 610, 620 are not necessary to extend over the edges of the display panel 110, merely covering the first curved surface 111 and second curved surface 112, respectively.

Although the preferred embodiments of present invention have been described herein, the above description is merely illustrative. Further modification of the present invention disclosed will occur to those skilled in the respective arts and all such modifications are deemed to be within the scope of the invention defined by the appended claims.

What is claimed is:

1. A manufacturing method of a display module, comprising:
   pressing a display panel to make the display panel have a curved shape and a first curved surface by using a curve-forming mold;
   distributing a curable material on the first curved surface;
   forming a mold-releasing layer on an inner side of a carrier;
   pressing the curable material onto the first curve surface by the carrier; and
   curing the curable material to form a cured casing,
   wherein the cured casing is attached to the first curved surface with an adhesion force to sustain the curved shape of the display panel.

2. The manufacturing method of claim 1, wherein the curve-forming mold comprises a curved sucking device and a base having a shape corresponding to the curved sucking device, the step of forming the first curved surface comprises:
   the curved sucking device pressing the display panel against the base to form the curved shape; and
   sucking the display panel by the curved sucking device and maintaining the curved shape of the display panel.

3. The manufacturing method of claim 1, wherein the step of distributing the curable material comprises:
   directly distributing the curable material on the first curved surface.

4. The manufacturing method of claim 1, wherein the step of curing the curable material comprises:
   heating the curable material to cure the curable material.

5. The manufacturing method of claim 1, wherein the first curved surface of the display panel comprises an optical region and a substrate region, the step of distributing the curable material comprises distributing the curable material to cover at least a portion of the substrate region.

6. The manufacturing method of claim 1, further comprising:
   distributing the curable material on a second curved surface opposite to the first curved surface of the display panel; and
   curing the curable material to form a cured casing, wherein the cured casing is attached to the second curved surface with an adhesion force therebetween to maintain the curved shape of the display panel.

7. A manufacturing method of a display module, comprising:
   pressing a display panel to make the display panel have a curved shape and a first curved surface by using a curve-forming mold;
   forming a mold-releasing layer on an inner side of a carrier;
   distributing a curable material on the mold-releasing layer of the carrier; and
   pressing the curable material onto the first curve surface by the carrier;
   curing the curable material to form a cured casing,
   wherein the cured casing is attached to the first curved surface with an adhesion force to sustain the curved shape of the display panel.

8. The manufacturing method of claim 7, wherein the step of curing the curable material comprises:
   irradiating the curable material with light through a transparent region on bottom of the carrier to cure the curable material.

9. The manufacturing method of claim 8, wherein the step of distributing the curable material comprises:
   forming the mold-releasing layer on the transparent region of the carrier, wherein the mold-releasing layer is made from a transparent material.

10. The manufacturing method of claim 7, wherein the step of curing the curable material comprises:
    irradiating the curable material with light from a side of the carrier to cure the curable material.

11. The manufacturing method of claim 7, wherein the step of curing the curable material comprises:
    heating the curable material to cure the curable material.

12. The manufacturing method of claim 7, wherein the first curved surface of the display panel comprises an optical region and a substrate region, the step of distributing the curable material comprises distributing the curable material to cover at least a portion of the substrate region.

13. The manufacturing method of claim 7, wherein the step of pressing the curable material comprises:
    embedding the first curved surface of display panel into the curable material.

* * * * *